United States Patent [19]
Matsubara et al.

[11] Patent Number: 5,323,205
[45] Date of Patent: Jun. 21, 1994

[54] DIVIDED BLADE AND SLIT-FORMING BLADE FOR FOCAL PLANE SHUTTER

[75] Inventors: Takashi Matsubara; Masanori Hasuda, both of Yokohama, Japan

[73] Assignee: Nikon Corporation, Tokyo, Japan

[21] Appl. No.: 114,966

[22] Filed: Sep. 2, 1993

[30] Foreign Application Priority Data

Sep. 10, 1992 [JP] Japan .................. 4-242238
May 28, 1993 [JP] Japan .................. 5-127068

[51] Int. Cl.$^5$ .............................. G03B 9/40
[52] U.S. Cl. ............................ 354/431; 354/246
[58] Field of Search ................ 354/245–249, 354/431

[56] References Cited

U.S. PATENT DOCUMENTS 4,392,728  7/1983  Yoshida .................. 354/241
4,407,574 10/1983  Tomino et al. ............ 354/246

FOREIGN PATENT DOCUMENTS 3-68928  3/1991  Japan .

Primary Examiner—David M. Gray
Attorney, Agent, or Firm—Oliff & Berridge

[57] ABSTRACT

In the focal plane shutter having front and rear curtains disposed between lens and film on the camera, each of the front and rear curtains has a plurality of divided blades, and the shutter performs exposure to the film by forming a slit of a predetermined width between edge surfaces opposed to each other of the front and rear curtains, each of the divided blades comprises a light-reflective lens-side surface and a light-reflective slit-side edge surface having respective predetermined rates of diffused reflection. The lens-side surface is formed to have a rate of diffused reflection in a range of 7 to 30% within the region of visible light, as the predetermined rate of diffused reflection. The slit-side edge surface is formed to have a low rate of diffused reflection of not greater than 15% within the region of visible light, as the predetermined rate of diffused reflection. With this divided blades, the rate of reflection of the surface of the shutter curtain is applicable to a rate of reflection that enables TTL multi-pattern light adjustment and also unevenness of exposure is prevented from occurring.

16 Claims, 5 Drawing Sheets

Fig. 3
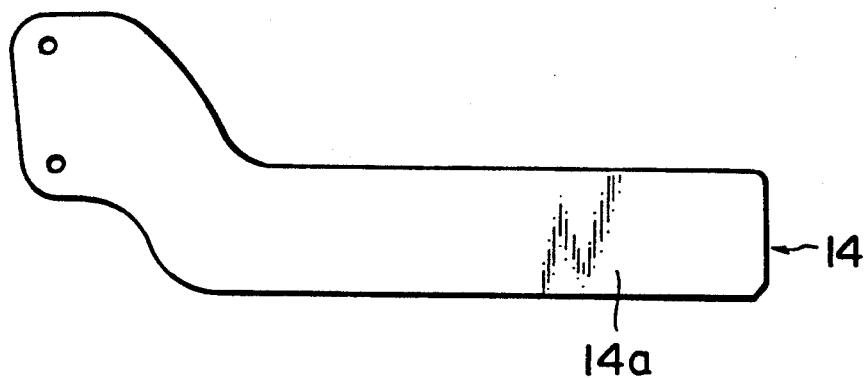
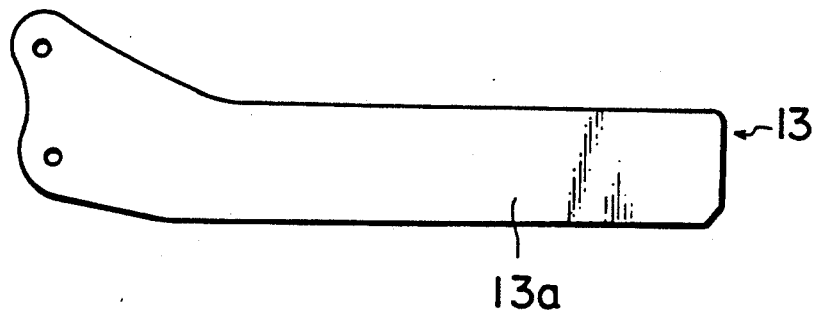
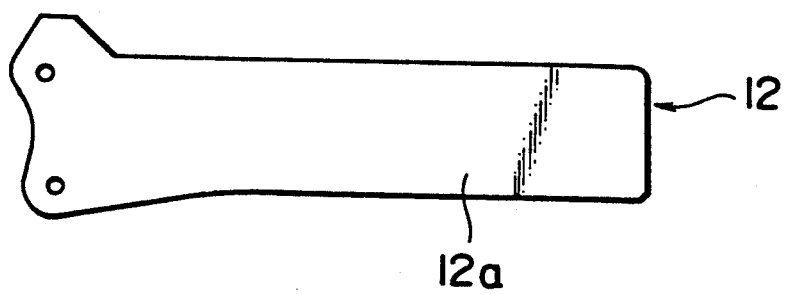
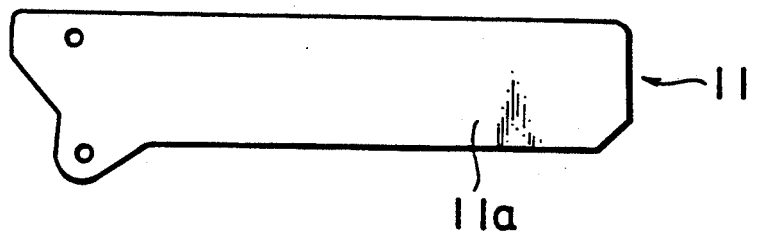

DIVIDED BLADE AND SLIT-FORMING BLADE FOR FOCAL PLANE SHUTTER

BACKGROUND OF THE INVENTION

1. Field of the Invention

The present invention relates to divided blade and slit-forming blade constituting the front and rear curtains of a focal plane shutter of the camera positioned near the exposure aperture of a camera and disposed between the lens and the film in the camera.

2. Related Background Art

Conventional TTL light adjustment has encountered exposure results of photographing that are widely dispersed depending on conditions of a subject since such conventional TTL light adjustment is performed in a manner that the quantity of flashing light is controlled so that the average value, across a specific area of film surface, of exposure light reflected from a subject and incident on the film surface and adapted to be received by a photoreceptor device for monitoring, reaches a predetermined exposure light level when flashing light is adjusted.

For example, in the case of a camera having a photoreceptor device enabled to receive light incident to the entire exposure area of the film surface, if a photograph is taken using light flashing in a field where a main subject occupies a small area and the background of the main subject constitutes a wide space, the portion that does not reflect the flashing light becomes wide, and thereby, the quantity of reflected light received by the photoreceptor is smaller, so that the quantity of flashing light so controlled becomes greater and may cause over-exposure for the main subject.

On the other hand, if a photograph is taken using light flashing in a field where an object of a high rate of reflection such as a gold-leafed folding screen is standing right behind a main subject in the case of the same cameras as above, the quantity of reflected light received by the photoreceptor is greater, so that, as a result, the quantity of flashing light so controlled becomes greater and may cause under-exposure for the main subject.

To solve this problem, a TTL automatic light adjustment control device has been proposed in a Japanese Patent Laid-open Publication 3-68928 as means for eliminating dispersion in the light exposure for a main subject due to difference between conditions of factors for subjects in the subject field such as the location and rate of reflection for such subjects in photographing using light flashing.

The TTL automatic light adjustment control device, or simply, the automatic control device, has a plurality of photoelectric means disposed at positions where the photoelectric means can receive light reflected by the film surface, the plurality of photoelectric means each being capable of measuring the light reflection intensity from each of regions of subject field obtained by dividing the subject field into one single central region and a plurality of peripheral regions.

In the process, preliminary flashing of a flashing device is activated immediately before the focal plane shutter of a camera is opened so that the preliminary flashing light is firstly reflected by the subjects onto the lens-side surface of the shutter curtain of the focal plane shutter through the lens. The first reflected preliminary flashing light is secondly reflected by the lens-side surface of the shutter curtain of the focal plane shutter, then received and processed by the plurality of photoelectric means corresponding to the respective regions of the subject field.

The automatic control device integrates the light reflection intensity values outputted from each of the plurality of photoelectric means, and outputs these integrations as the detected values for the subject field rates of reflection based on the preliminary flashing light for the respective regions of the subject field.

Thus, the degree of weighting, or the weighting coefficient for each divided region of the subject field is determined such that the determined weighting coefficients enable an optimal exposure to be obtained for the main subject, by integrating computing the detected information on the rates of reflection for the respective regions of the subject field.

Successively, main flashing of the flashing device is activated immediately after the focal plane shutter of the camera is opened so that the reflected main flashing light is received and processed by the same plurality of photoelectric means as described above.

The automatic control device weights the light reflection intensity values of the main flashing that is outputted from the plurality of photoelectric means, with the weighting coefficient predetermined as described above.

The automatic control device then sums up and integrates the weighted outputs, and compares the integrated values of the weighted outputs with predetermined values. Thus, the automatic control device ceases the main flashing according to timing determined by such comparison, thereby completing the light adjustment of the main flashing. Such system of light adjustment is referred to as the "TTL multi-pattern light adjustment".

When a conventional focal plane shutter is used with a TTL automatic light adjustment control device described above, reflected light from the lens-side surface of the shutter curtain is required to reach the photoelectric means described above. Because of this, the lens-side surface of the shutter curtain is processed with high reflection rate painting (hereinafter also referred to as "whitening painting") for increasing the rate of reflection of the surface to a high value substantially equal to that of the film surface. It is noted that the surface of the shutter curtain so painted with a high reflection rate painting may have some variation in the rate of reflection thereof, in which the painted surface may look white to the naked eye when a relatively high reflection rate painting is applied to it, and rather gray to the naked eye when a relatively low reflection rate painting is applied to it. Colors resulting from high reflection rate surfacing painting as described above, including the gray-looking color, may be hereunder referred to as "white", whereby "whitening painting" may be referred to as "graying painting".

Recently, there has been a demand for higher shutter speeds and higher flash synchro speeds due to increased film sensitivity and desire for new image expression, whereby cameras have been provided that implemented a high shutter speed as high as 1/8000 sec. and a flash synchro speed of 1/250 sec.

In focal plane shutters for implementing such high speed photographing, front and rear curtains constituting a shutter curtain of the shutter are each divided into one slit-forming blade and a plurality of (usually around three) divided shielding blades. When a high shutter speed beyond a flash synchro speed is directed, the rear curtain is started moving with a specified temporal gap in the starting time behind the front curtain, and the width of spatial gap, or slit, between the slit-forming blades of the front and rear curtains, is either fixed to a predetermined value or varied in accordance with the speed, thereby enabling the film to be exposed with light through the slit. This exposure method is referred to as "slit exposure".

In the conventional focal plane shutter described above, with slit-side edge surfaces of the shutter curtains thereof covered with whitening painting of high rate of reflection painting that is applied to the shutter curtains, undesirable unevenness of exposure adversely occurs during the slit exposure due to reflection on such slit-side edge surface of the shutter curtains.

SUMMARY OF THE INVENTION

An object of the present invention is to provide divided blades and slit-forming blades such that the rate of reflection of the surface of the shutter curtain can be adjusted to a rate of reflection enabling TTL multi-pattern light adjustment, and, at the same time, unevenness of exposure can be prevented from occurring during the slit exposure.

In order to attain the object described above, according to one aspect of the present invention, a plurality of divided blades are provided in a focal plane shutter for a camera having front and rear curtains thereof disposed between lens and film of the camera, where each of the front and rear curtains has the plurality of divided blades, and the shutter performs exposure of the film by forming a slit of a predetermined width between edge surfaces opposed to each other of the front and rear curtains. Each of the divided blades comprises a light-reflective lens-side surface and a light-reflective slit-side edge surface having respective predetermined rates of diffused reflection. The lens-side surface is formed to have a rate of diffused reflection in a range of 7 to 30% within the region of visible light, as the predetermined rate of diffused reflection. The slit-side edge surface is formed to have a low rate of diffused reflection of not greater than 15% within the region of visible light, as the predetermined rate of diffused reflection.

According to another aspect of the present invention, slit-forming blades are provided in a focal plane shutter for a camera having front and rear curtains thereof disposed between lens and film of the camera, where each of the front and rear curtains has one slit-forming blade and at least one divided shielding blade, and the shutter performing exposure of the film by forming a slit of a predetermined width between edge surfaces opposed to each other of a pair of the slit-forming blades that form the slit. Each of the slit-forming blades comprises a light-reflection lens-side surface and a light-reflective slit-side edge surface having predetermined rates of diffused reflection. The lens-side surface is formed to have a rate of diffused reflection in a range of 7 to 30% within the region of visible light, as the predetermined rate of diffused reflection. The slit-side edge surface is formed to have a low rate of diffused reflection of not greater than 15% within the region of visible light, as the predetermined rate of diffused reflection.

The surfaces of the low rate of diffused reflection formed on the divided blades or the slit-forming blades are provided for the purpose of preventing unevenness of exposure from occurring during the slit exposure. While causes for unevenness of exposure were unknown, in order to find such causes, the present inventors conducted trial-and-error experiments based on various conjectures, and, as a result, came to a thought that such unevenness of exposure could be resulting from rates of diffused reflection varying depending on the wavelength of light, on surfaces provided with high reflection rate painting, or on surfaces where body material of high rate of reflection such as Al (Aluminum) alloy, Ti (Titanium), and the like, is exposed; in other words, variation of intensity of reflection that occurred depending on the wavelength of light, could cause unevenness of exposure to occur during the slit exposure.

Therefore, the inventors extensively looked for surfaces that would not cause reflection of various intensity depending on the wavelength of light, and, as a result, discovered that, at low rates of diffused reflection not more than 9%, in particular, not more than 6%, the rate of diffused reflection would remain substantially constant within the range of wavelength of visible light, and the problem of unevenness of exposure would not occur if the rate of diffused reflection of the slit-side edge surface is not more than 15%.

Consequently, the slit-side edge surface of the divided blades, or specifically, the slit-side edge surface of the slit-forming blades, according to the present invention, is formed to be a low reflection rate surface having a rate of diffused reflection not more than 15%. Therefore, the divided blades and the slit-forming blades, according to the present invention, have an advantage in that unevenness of exposure can be prevented from occurring with a focal plane shutter during the slit exposure, whereby a focal plane shutter can be implemented such that the rate of reflection of the surface of the shutter curtains can be adjusted to a rate of reflection enabling TTL multi-pattern light adjustment, and, at the same time, unevenness of exposure can be prevented from occurring during the slit exposure.

BRIEF DESCRIPTION OF THE DRAWINGS

FIG. 3 is a disassembled view of the divided blades according to the embodiment of the present invention shown in FIG. 1.

DESCRIPTION OF THE PREFERRED EMBODIMENTS

Figure 1:
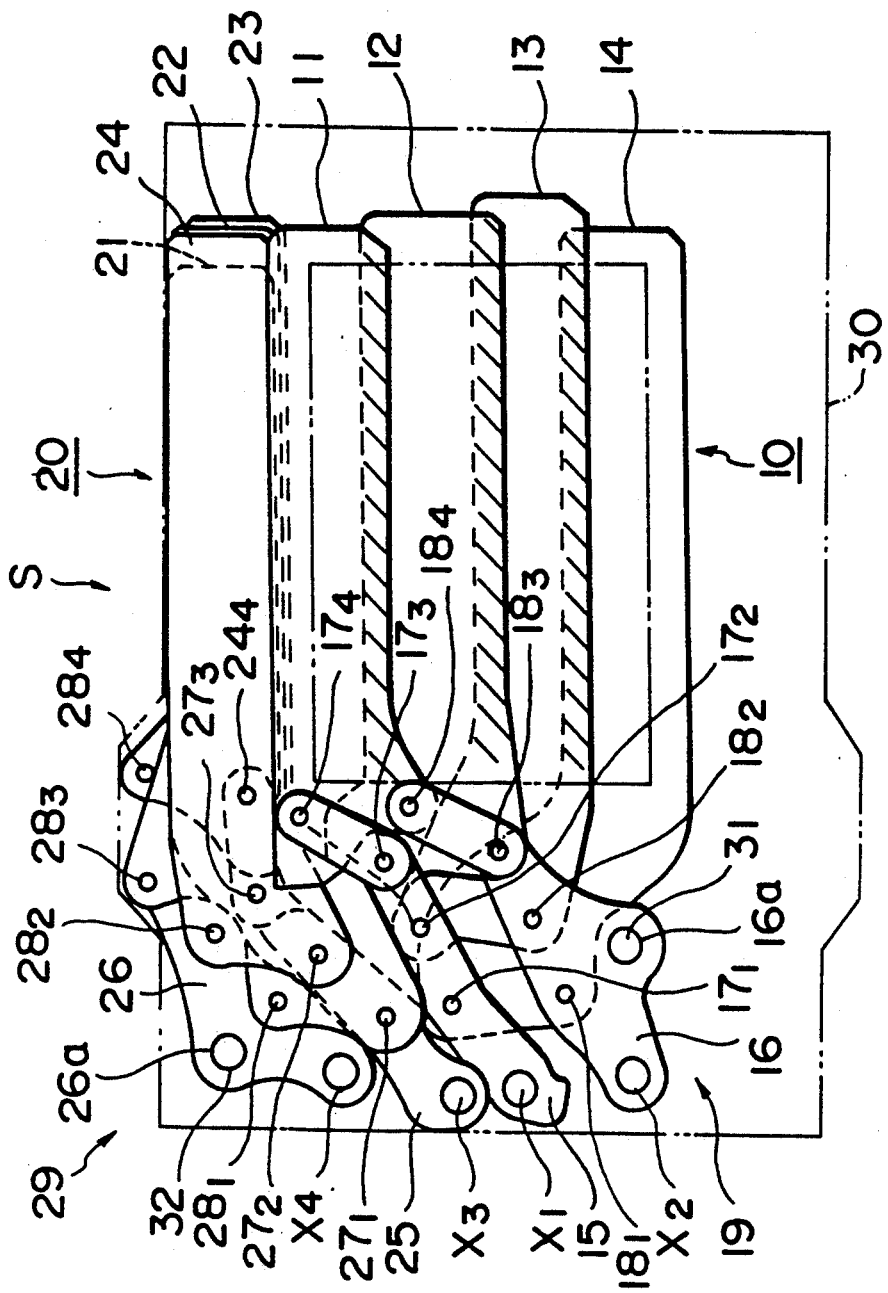
FIG. 1 is a front view of a focal plane shutter incorporating divided blades according to an embodiment of the present invention.
Figure 2:
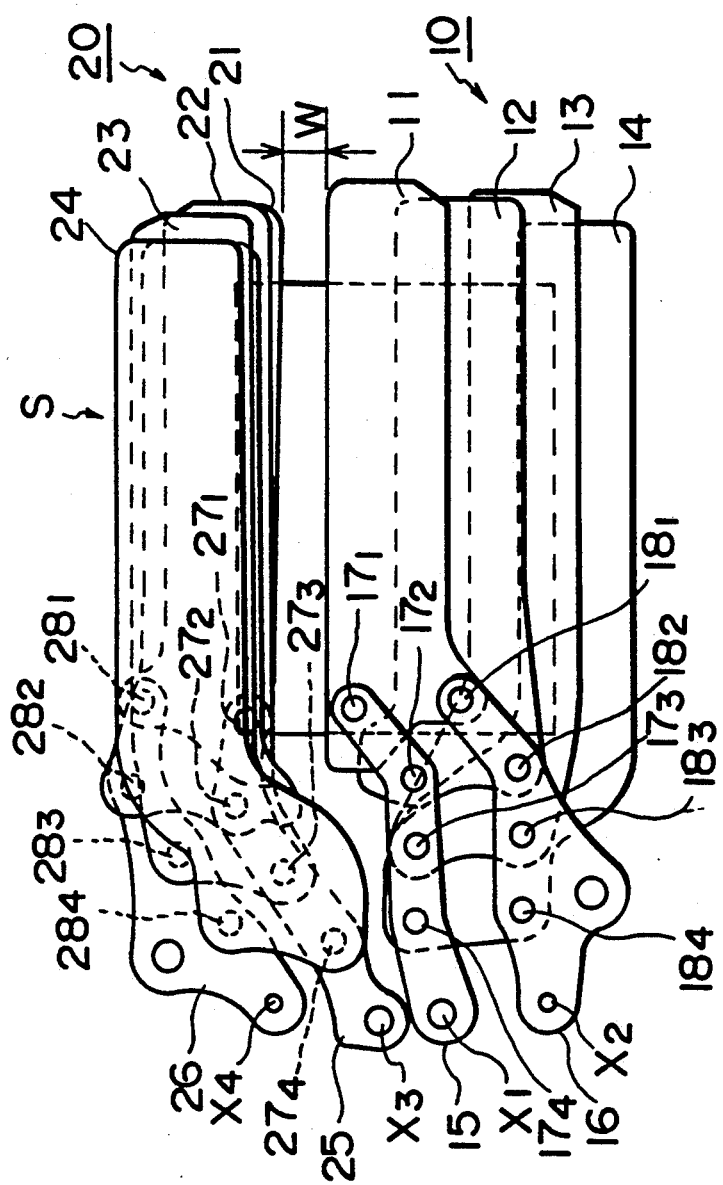
FIG. 2 is a front view of a focal plane shutter incorporating divided blades according to the embodiment of the present invention shown in FIG. 1, during slit exposure.
Figure 4:
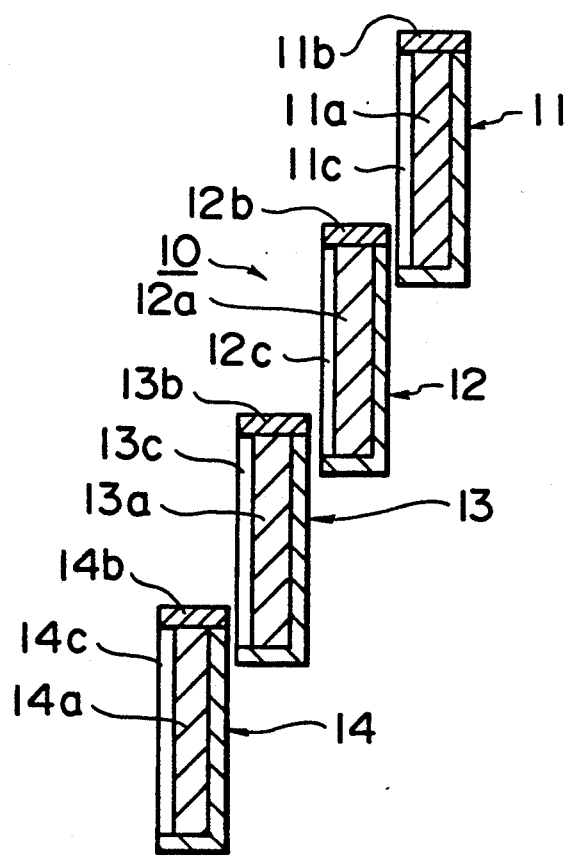
FIG. 4 is a schematic sectional illustration of divided blades according to a first example of the present invention.
Figure 5:
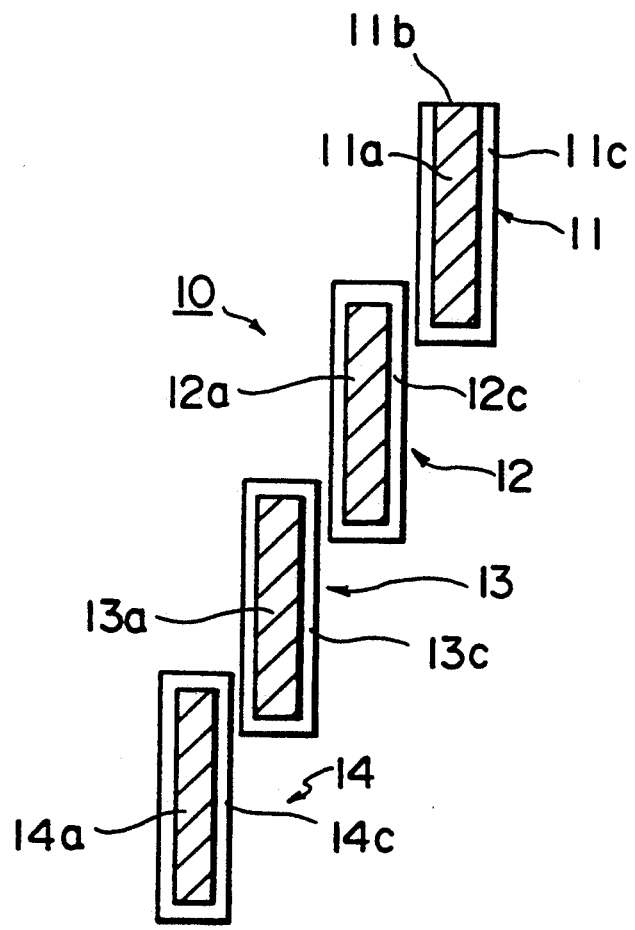
FIG. 5 is a schematic sectional illustration of divided blades according to a second example of the present invention.

FIGS. 1–5 show a focal plane shutter incorporating divided blades according to an embodiment of the present invention, where FIG. 1 shows a front view of the focal plane shutter; FIG. 2 shows a front view of the focal plane shutter of FIG. 1, illustrating a state of the moving front and rear curtains of the shutter during slit exposure; FIG. 3 shows a disassembled view of the divided blades shown in FIG. 1; and FIGS. 4–5 show schematic sectional illustrations of the divided blades, respectively.

The focal plane shutter S of a camera incorporating the divided blades according to the embodiment, as shown in FIG. 1 of the present invention, is disposed between lens and film (both not shown), in particular, is positioned near the exposure aperture of the camera. The shutter S comprises a front curtain 10, a rear curtain 20, and a shutter base plate 30.

The front curtain 10 comprises one slit-forming blade 11 and three divided shielding blades 12-14. Slit-forming blade and divided shielding blades are hereinafter collectively referred to as "divided blades". Arms 15, 16 respectively support the divided blades 11-14, and are rotatably connected to shafts $X_1$, $X_2$ that are secured to the shutter base plate 30. The slit-forming blade 11 and the divided shielding blades 12-14 are each rotatably connected to the arms 15, 16 by means of pins $17_4$-$17_1$ and pins $18_4$-$18_1$. Attached to a hole 16a of the arm 16 is a driving shaft 31, which operates to open and shut the front curtain 10, in other words, to develop and retract the divided blades 11-14 by driving force provided by a known shutter driving unit (not shown) when the shutter is driven.

The rear curtain 20 also comprises one slit-forming blade 21 and three divided shielding blades 22-24. Arms 25, 26 respectively support the slit-forming blade 21 and the divided shielding blades 22-24, and are rotatably connected to shafts $X_3$, $X_4$ that are secured to the shutter base plate 30. The slit-forming blade 21 and the divided shielding blades 22-24 are each rotatably connected to the arms 25, 26 by means of pins $27_4$-$27_1$ and pins $28_4$-$28_1$. Attached to a hole 26a of the arm 26 is a driving shaft 32, which operates to open and shut the rear curtain 20 by driving force provided by a known shutter driving unit (not shown) when the shutter is driven.

These arms 15, 16, 25, 26, shafts $X_1$-$X_4$, pins 17, 18, 27, 28, and driving shaft 31, 32 constitute driving mechanisms 19, 29 for moving the divided blades 11-14, 21-24, respectively.

When a high shutter speed beyond a flash synchro speed is directed, the driving shaft 31 is first moved downward by driving force provided by the shutter driving unit (not shown), then the divided blades 11-14 are moved downward successively with the uppermost slit-forming blade 11 first started being moved downward, as shown in FIG. 2. When a slit having a predetermined width W is formed between the respective slit-forming blades 11, 21 of the front and rear curtains 10, 20, the driving shaft 32 is similarly moved downward, whereby the front and rear curtains 10, 20 are moved downward with a delayed timing for the movement of the rear curtain 20 so that the slit of width W is maintained between the slit-forming blades 11, 21. In this way, slit exposure is implemented.

Now, the front and rear curtains 10, 20 of the present embodiment will be discussed more in detail.

Plate material for plate members of the divided blades 11-14, 21-24 as described above, may be made of FRP, light metal such as Ti (Titanium), Al (Aluminum) alloy, plastics, or light weight ceramics.

FRP, or Fiber-Reinforced Plastics, comprises fiber and matrix resin. Kinds of fiber that may be used as the fiber for FRP are either continuous aromatic polyamide fiber or continuous ultra high molecular weight polyethylene fiber, besides continuous of carbon fiber. Particularly when FRP is made to be a multi-layer structure, for the intermediate layer thereof, fiber other than carbon fiber may be used. For the intermediate layer in a three-layer construction (the three layers comprising a front surface layer, an intermediate layer, and a back surface layer), short fiber may be used instead of continuous fiber. FRP using carbon fiber as its fiber is referred to as "CFRP".

Kinds of resin that may be used as the matrix resin for FRP are either (1) thermoplastic resin such as celluloid, cellulose acetate, cellulose propionate, cellulose butyrate, 6-nylon, 6.6-nylon, ABS (Acrylonitrile-Butadiene-Stylene) resin, AS (Acrylonitrile-Stylene) resin, high density polyethylene, polypropylene, polyacetal, polycarbonate, polyethylene terephthalate, polybutylene terephthalate, polyether ketone, polyether etherketone, polysulfone, polyether sulfone, polyether imide, polyallylate, polyamide elastomer, ionomer, crystal liquid polymer, polyimide, polyamide imide, fluororesin, PPS (PolyPhenylene-Sulfide), denatured polyphenylene oxide; or (2) thermoset resin such as epoxy resin, unsaturated polyester resin, polyurethane, and polyimide.

In the case where carbon fiber is used, CFRP is provided with light shielding capability to some extent due to black color of carbon fiber. In order to increase light shielding capability which is characteristics required of a shutter, however, carbon black may be dispersively added beforehand into resin liquid that constitutes precursor of matrix resin, when prepreg sheet is fabricated. Otherwise, a special resin liquid may be separately prepared by mixing with a high concentration of carbon black, so that the special resin liquid so prepared may be penetrated under pressure into ordinary prepreg sheet by using an applicator such as a roll coater. Carbon black also has an effect of increasing lubricity or slippery smoothness of the surface of the divided blade, resulting in lesser abrasion of the surface of the divided blades even when the divided blades are rubbing each other.

Carbon black for this use is preferred to have an average grain diameter not greater than 0.07 $\mu$m, particularly not greater than 0.01 $\mu$m. A preferred mixing ratio of carbon black is within a range of 3 to 15 weight percentage to resin liquid having 100 weight percentage of solid. If the ratio is 15 weight percentage or over, fiber orientation becomes deteriorated, so that flatness is adversely affected; fluidity of the liquid resin becomes also decreased, so that holes may appear inside and peeling may occur between layers.

An appropriate resin percentage in prepreg sheet may be 30 to 50 weight percentage, particularly 38 to 48 weight percentage. If resin percentage is less, holes and fine cracks occur in appearance, and paintability decreases; furthermore, unevenness (or protuberances and dents) appears on the material surface, so that abrasion resistance and lubricity of the divided blade decreases, and besides, appearance becomes deteriorated. In addition, such less resin percentage may results in streaks on the surface when resin is cast in, which may also deteriorate appearance.

Surface fiber density in prepreg sheet that specifies fiber quantity in grams contained in one square meter of the sheet, may be 10 to 60 g/m$^2$. Each layer of prepreg sheet may be 15 to 70 $\mu$m thick. All the prepreg sheet layers need not having a same thickness. Prepreg sheet layers of various layer thicknesses and surface fiber densities can be combined if such layers are used to be plane symmetric in the direction of thickness with respect to the neutral or central plane of the divided blade. If the layer thicknesses fall within the specified thickness range, the thickness and surface fiber density of the intermediate layer may be advantageously made greater than those of one surface layer (either one of the front and back surface layers) to increase flexural rigidity in total.

Prepreg sheet may be formed to be a sheet of plate material, first by laminating at least three, for example, three, four, or five, layers so that the orientation of fiber in the surface layer is orthogonal or substantially orthogonal with that of the intermediate layer, and so that the surface and intermediate layers are plane symmetric in the direction of thickness to the neutral plane of the divided blade, and then by heating and press-forming the laminated layers. Thus, thermoset resin liquid yet to be hardened is solidified by cross-linking. In this way, plate material made of FRP, 50 to 120 $\mu$m thick, is obtained for the divided blade.

Now, the process of forming divided blades 11-14 from the plate material described above, will be discussed. The process of forming divided blades 21-24 is the same as that of divided blades 11-14, and, therefore, will not be discussed.

Blade bodies 11a-14a are formed by punching specified shapes of the divided blades 11-14, as shown in FIG. 3, out of various plate material formed as described above. Specifically, around twenty to forty blade bodies are punched out of one sheet of plate material. In case of FRP, the punching is conducted so that the orientation of continuous fiber in the surface layer is aligned to the longitudinal direction of the divided blade. In punching, it is common to punch holes for inserting pins 17, 18, out of plate material punched as the blade body, at the same time.

Next, high reflection rate surfaces 11c-14c are formed on the divided blades 11-14, by applying high reflection rate painting enabling TTL multi-pattern light adjustment, to the blade bodies 11a-14a so punched out, as shown in FIG. 4, where the rate of reflection of the high reflection rate surfaces 11c-14c is set to be substantially equal to that of the film surface. Then, low reflection rate surfaces 11b-14b are formed on the slit-side edge surface of the divided blades 11-14 by applying low reflection rate painting (hereinafter also referred to as "blackening painting") to the slit-side edge surfaces of the blade bodies 11a-14a. Low reflection rate painting is used for preventing unevenness of exposure during slit exposure.

Painting may be applied to the blade bodies 11a-14a in a manner that high reflection rate painting is applied only to the lens-side surface of the blade bodies 11a-14a, and low reflection rate painting is applied to the film-side surface and the slit-side edge surface of the blade bodies 11a-14a. Application of low reflection rate painting to the film-side surface of the blade bodies 11a-14a can prevent multi-reflection of light between the film-side surface of the divided blades and the film surface, thereby preventing both flare and unevenness of exposure. In the case where the rate of diffused reflection of material of the blade bodies 11a-14a constituting the divided blades 11-14 is low enough, the low reflection rate surface 11b may be formed on the slit-side edge surface of the divided blades by exposing the material of the blade bodies on the slit-side edge surface instead of applying low reflection rate painting to the slit-side edge surface, as shown in FIG. 5. Also, as a choice, low reflection rate painting may be applied only to the slit-side edge surface of the blade body 11a of the slit-forming blades 11, but not to the slit-side edge surface of the blade bodies 12a-14a of other divided blades, or the divided shielding blades 12-14. Formation of low reflection rate surfaces only to the slit-side edge surface 11b of the blade body 11a of the slit-forming blade 11 enables the production process to be simplified.

In applying low reflection rate painting, processing efficiency may be improved by setting the blade bodies 11a-14a together in a jig so that painting may be applied only to the slit-side edge surface of the blade bodies 11a-14a so set in the jig. In doing this, low reflection rate painting may be desirably prevented from extending beyond the edge surface onto the high reflection rate paint coated lens-side surface of the divided blades, either by covering the high reflection rate paint coated lens-side surface using a jig dedicated to low reflection rate painting, or by devising a special painting method. However, it is preferable that a narrow region on the lens-side surface, immediately adjacent to the edge surface and not greater than 1 mm in width, may have low reflection rate painting (blackening painting) applied thereto, from the viewpoint of prevention of light leakage through gap between overlapped edge regions of immediately adjacent and mutually overlapping divided blades (hereinafter referred to as "light leakage between curtains"). It is also preferable for simplifying the process if the painting process is implemented in a manner that high reflection rate painting is applied to one face of a sheet of plate material assigned to be the lens-side surface, before the blade bodies are punched out of the sheet of plate material, then, after the punching, low reflection rate painting is applied to the film-side surface so that the low reflection rate painting extending beyond the film-side surface may be utilized to cover the slit-side edge surface.

The rate of diffused reflection of high reflection rate painting may be set within a range of 7-30%, and the rate of diffused reflection of low reflection rate painting may be not greater than 15%, preferably not greater than 9%, more preferably not greater than 6%. A rate of diffused reflection can be easily measured by using a spectrophotometer for a wavelength range of 400-800 nm, or simply, within the region of visible light. According to the measurement by the inventors, the rate of diffused reflection of high reflection rate painting varies depending on wavelength, with the rate of reflection increasing as wavelength decreases. According to the inventors' further findings, however, it has been known that the rate of diffused reflection of low reflection rate painted surface with a rate of reflection not greater than 9%, particularly not greater than 6%, is substantially constant for a wavelength range of 400-800 nm, or simply, within the region of visible light, and that no problem of unevenness of exposure would occur with rates of diffused reflection not greater than 15%. Therefore, by providing the slit-side edge surface of divided blades 11-14 with the low reflection rate surfaces 11b-14b, reflection on the slit-side edge surfaces can be made even without any dependence on wavelength of light.

Those high reflection rate painting and low reflection rate painting may be preferably provided with surface lubricity and abrasion resistance. The thickness of painting film in high reflection rate painting or low reflection rate painting, after dried and hardened, may be typically 0.1 to 10 $\mu$m, preferably 3 to 6 $\mu$m, since a thicker painting may cause warp in the divided blade.

Limiting the rate of diffused reflection of high reflection rate painting within 7-15% is advantageous to preventing light leakage between curtains.

It is also known that, in the case where paint coating unevenness, and/or burr caused by punching, exist on a slit-side edge surface of the divided blades 11-14, 21-24, particularly slit-forming blades 11, 21 forming a slit, undesired unevenness of exposure is likely to occur during slit exposure. As a countermeasure, the slit-side edge surface of the divided blades, particularly slit-forming blades 11, 21 forming the slit, may be lightly ground. Grinding can be classified into, for example, lapping, polishing and smoothing, according to roughness of the ground surface. Grinding can be also classified into grinding with fixed abrasive grain such as emery paper and water-proof abrasive paper, and grinding with free abrasive grain, according to grinding means.

The problem of unevenness of exposure during slit exposure due to paint coating unevenness and/or burr, can be eliminated by grinding. Such grinding may be done in a manner of grinding each of divided blades separately with fine water-proof abrasive paper of grain fineness number greater than No. 80, preferably greater than No. 400, or in a manner of grinding several divided blades set together in a jig, using a grinding or lapping machine.

When painting is applied to the slit-side edge surface of the divided blades 11-14, 21-24, grinding may be done preferably after painting, though grinding is possible both before and after painting. This is because ultimate surface unevenness of the slit-side edge surface of the divided blades 11-14, 21-24 can be smoothed if grinding is done after painting. When grinding the low reflection rate paint coated portion, finer abrasive material or paper is desired to be used since using coarse abrasive material or grain makes it difficult to secure stabilized quality. For avoiding deviation in the dimensions of a divided blade, grinding may be done preferably rather within the thickness of paint coating, in whole or in part, than beyond the thickness of paint coating into the thickness of the original blade body of the divided blade.

Upon extensive study, the inventors discovered that, though varied according to slit width, for example, in the case where the slit width is as small as 0.5 to 1 mm at the beginning of exposure as in the case of high speed shutter, unevenness of exposure is likely to occur if protuberances or dents greater than 20 to 40 $\mu$m dia., or 20×20 to 40×40 $\mu$m square exist. Thus, in the case, grinding to decreased unevenness not greater than 30 $\mu$m, particularly not greater than 10 to 20 $\mu$m is preferred.

Implementation of the divided blades of a focal plane shutter according to the present invention is not limited to the embodiments described above, but various changes and modifications to such embodiments will be apparent to those skilled in the art. For example, this focal plane shutter according to the present invention is not limited to shutters responding to TTL automatic light adjustment device, but can be applied to all the shutters equipped with high reflection rate surfaces for measurement of shutter surface reflection.

EXAMPLE 1

In this first example of divided blades 11-14, 21-24 respectively constituting front and rear curtains 10, 20 of a focal plane shutter S, as shown in FIG. 1, blade bodies 11a-14a of the divided blades 11-14 of the front curtain 10 were made of metallic material such as Al and Ti. As shown in FIG. 4, low reflection rate surfaces 11b-14b were provided on the slit-side (i.e. the upper side in FIG. 1) edge surfaces and film-side surfaces of the divided blades 11-14 of the front curtain 10, by applying blackening painting; and high reflection rate surfaces 11c-14c were provided on the lens-side surfaces of the blade bodies 11a-14a of the divided blades 11-14 of the front curtain 10, for responding to TTL automatic light adjustment control device (not shown). The high reflection rate surfaces 11c-14c were implemented by applying whitening painting. The construction of the rear curtain 20 was the same as that of the front curtain 10, and, therefore, illustration and description of the rear curtain 20 will be omitted.

The divided blades 11-14, specifically the slit-forming blade 11 and the divided shielding blades 12-14, of this first example, were fabricated in such process as described below.

First, blade bodies 11a-14a were formed by punching specified shapes of the divided blades 11-14, as shown in FIG. 3, out of metallic plates of Al or Ti. In punching, holes for inserting pins 17, 18, may be preferably punched out of the metallic plate punched as the blade body, at the same time.

Then, whitening painting, 3-6 $\mu$m thick, was applied to the lens-side surface of the blade bodies 11a-14a of the divided blades 11-14 to form the high reflection rate surfaces 11c-14c. Subsequently, blackening painting, 3-6 $\mu$m thick, was applied to the film-side surface and the slit-side edge surface of the blade bodies 11a-14a of the divided blades 11-14 to form the low reflection rate surfaces 11b-14b. The rate of diffused reflection of the whitening painting was set at 7-30%, while the rate of diffused reflection of the blackening painting was set at not greater than 15%, preferably not greater than 9%, more preferably not greater than 6%.

Finally, the divided blades 11-14 having the low reflection rate surfaces 11b-14b and the high reflection rate surfaces 11c-14c so formed, were connected to arms 15, 16 and assembled as the front curtain 10 on the shutter base plate 30, to complete the focal plane shutter S, as shown in FIG. 1, together with the rear curtain 20 assembled similarly to the front curtain 10.

Then, this focal plane shutter S having the above described construction, and a focal plane shutter having conventional divided blades that were not equipped with low reflection rate surfaces 11b-14b, were respectively incorporated into an actual camera and tested with actual photographing by means of slit exposure, whereby, as a result, no unevenness of exposure was observed with this focal plane shutter S that was equipped with low reflection rate surfaces 11b-14b by blackening painting, while unevenness of exposure occurred with the conventional focal plane shutter that was not equipped with low reflection rate surfaces 11b-14b.

EXAMPLE 2

In this second example of divided blades 11-14, 21-24 respectively constituting front and rear curtains 10, 20 of a focal plane shutter S, as shown in FIG. 1, blade bodies 11a-14a of the divided blades 11-14 of the front curtain 10 were made of CFRP plate material. As shown in FIG. 5, low reflection rate surface 11b was provided on the slit-side (i.e. the upper side in FIG. 1) edge surfaces of the blade body 11a of the slit-forming blade 11 of the front curtain 10; and high reflection rate surfaces 11c-14c were provided on other surfaces of the blade bodies 11a-14a of the divided blades 11-14 of the front curtain 10, for responding to TTL automatic light adjustment control device (not shown). The high reflection rate surfaces 11c-14c were implemented by applying whitening painting. Like the first example, the construction of the rear curtain 20 was the same as that of the front curtain 10, and, therefore, illustration and description of the rear curtain 20 will be omitted.

The divided blades 11-14, specifically the slit-forming blade 11 and the divided shielding blades 12-14, of this second example, were fabricated in such process as described below.

First, whitening painting, 3-6 μm thick, was applied to the entire surfaces of the blade bodies 11a-14a of the divided blades 11-14 punched out of a sheet of CFRP plate material, as described above, to form the high reflection rate surfaces 11c-14c.

After that, the whitening painting applied to the slit-side edge surface of the slit-forming blade 11 was removed by lightly grinding with emery paper of grain fineness number 150, 400, 600, or 1200. It is noted that, though the slit-side edge surface was made only comprising an unpainted and exposed CFRP material surface, application of blackening painting was not required since the rate of diffused reflection of the CFRP surface was not greater than 6%, and, thereby, the exposed CFRP surface itself served as the low reflection rate surface 11b.

Finally, the divided blades 11-14 having the low reflection rate surface 11b and the high reflection rate surfaces 11c-14c so formed, were connected to arms 15, 16 and assembled as the front curtain 10 on the shutter base plate 30, to complete the focal plane shutter S, as shown in FIG. 1, together with the rear curtain 20 assembled similarly to the front curtain 10.

Then, this focal plane shutter S having the above described construction, and a focal plane shutter having conventional divided blades that were not equipped with low reflection rate surface 11b, were respectively incorporated into an actual camera and tested with actual photographing by means of slit exposure, whereby, as a result, no unevenness of exposure was observed with this focal plane shutter S that was equipped with low reflection rate surface 11b, while unevenness of exposure occurred with the conventional focal plane shutter that was not equipped with low reflection rate surface 11b.

We claim:

1. In a focal plane shutter for a camera, having front and rear curtains disposed between lens and film in said camera, said front and rear curtains each having a plurality of divided blades, said shutter performing exposure to said film by forming a slit of a predetermined width between edge surfaces opposed to each other of said front and rear curtains,
   said divided blades each comprising a light-reflective lens-side surface and a light-reflective slit-side edge surface having respective predetermined rates of diffused reflection,
   said lens-side surface being formed to have a rate of diffused reflection in a range of 7 to 30% within the region of visible light, as said predetermined rate of diffused reflection,
   said slit-side edge surface being formed to have a low rate of diffused reflection of not greater than 15% within the region of visible light, as said predetermined rate of diffused reflection.

2. Divided blades according to claim 1, wherein said slit-side edge surface having said low rate of diffused reflection is a painted surface.

3. Divided blades according to claim 1, said divided blades each further comprising a blade body made of material having a rate of diffused reflection not greater than 15% within the region of visible light,
   said slit-side edge surface of said divided blades being an exposed surface of said blade body, and surfaces other than said slit-side edge surface of said divided blades being painted surfaces.

4. Divided blades according to claim 3, said divided blades each further comprising a blade body made of carbon fiber reinforced plastics.

5. Divided blades according to claim 4, wherein said carbon fiber reinforced plastics comprises resin that contains carbon black.

6. Divided blades according to claim 1, wherein said slit-side edge surface is formed to have a rate of diffused reflection of not greater than 6% within the region of visible light, as said predetermined rate of diffused reflection.

7. Divided blades according to claim 1, wherein said lens-side surface is formed to have a rate of diffused reflection in a range of 7 to 15% within the region of visible light, as said predetermined rate of diffused reflection.

8. Divided blades according to claim 1, said divided blades each further comprising a light-reflective film-side surface having a predetermined rate of diffused reflection,
   said film-side surface being formed to have a rate of diffused reflection not greater than 15%, as said predetermined rate of diffused reflection.

9. Divided blades according to claim 8, wherein said film-side surface is formed to have a rate of diffused reflection not greater than 6%, as said predetermined rate of diffused reflection.

10. Divided blades according to claim 8, wherein said rate of diffused reflection of said film-side surface is substantially the same as said rate of diffused reflection of said slit-side edge surface.

11. Divided blades according to claim 1, wherein said slit-side edge surface has protuberances and dents thereon formed to be not greater than 30 μm.

12. Divided blades according to claim 11, wherein said slit-side edge surface of said rate of diffused reflection is a ground surface.

13. In a focal plane shutter for a camera, having front and rear curtains disposed between lens and film in said camera, said front and rear curtains each having one slit-forming blade and at least one divided shielding blade, said shutter performing exposure to said film by forming a slit of a predetermined width between edge surfaces opposed to each other of a pair of said slit-forming blades that form said slit,
   said slit-forming blades each comprising a light-reflective lens-side surface and a light-reflective slit-side edge surface having respective predetermined rates of diffused reflection,
   said lens-side surface being formed to have a rate of diffused reflection on a range of 7 to 30% within the region of visible light, as said predetermined rate of diffused reflection, said slit-side edge surface being formed to have a low rate of diffused reflection of not greater than 15% within the region of visible light, as said predetermined rate of diffused reflection.

14. Slit-forming blades according to claim 13, said slit-forming blades each further comprising a blade body made of material having a rate of diffused reflection not greater than 15% within the region of visible light, and wherein surfaces other than said slit-side edge surface of said slit-forming blades are painted surfaces.

15. Slit-forming blades according to claim 13, wherein said slit-side edge surface is formed to have a rate of diffused reflection not greater than 6% within the region of visible light, as said predetermined rate of diffused reflection.

16. Slit-forming blades according to claim 13, wherein said slit-side edge surface has protuberances and dents thereon formed to be not greater than 30 $\mu$m.

* * * * *